US009179196B2

(12) United States Patent
Fucci

(10) Patent No.: US 9,179,196 B2
(45) Date of Patent: Nov. 3, 2015

(54) INTERLEAVED VIDEO STREAMS

(75) Inventor: Marco Fucci, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 453 days.

(21) Appl. No.: 13/402,802

(22) Filed: Feb. 22, 2012

(65) Prior Publication Data

US 2014/0241426 A1    Aug. 28, 2014

(51) Int. Cl.
| | | |
|---|---|---|
| *H04N 7/12* | (2006.01) | |
| *H04N 21/6375* | (2011.01) | |
| *H04N 7/14* | (2006.01) | |
| *H04N 21/845* | (2011.01) | |
| *H04N 19/895* | (2014.01) | |
| *H04L 1/18* | (2006.01) | |

(52) U.S. Cl.
CPC .......... *H04N 21/6375* (2013.01); *H04L 1/1809* (2013.01); *H04N 7/147* (2013.01); *H04N 19/895* (2013.01); *H04N 21/8451* (2013.01)

(58) Field of Classification Search
CPC ........... H04N 7/06; H04N 7/063; H04N 7/50; H04N 7/26244; H04N 7/327; H04N 7/3077; H04N 7/64; H04N 7/68
See application file for complete search history.

(56) References Cited

U.S. PATENT DOCUMENTS

| | | | |
|---|---|---|---|
| 6,493,392 B1 | 12/2002 | Moon et al. | |
| 7,103,669 B2 * | 9/2006 | Apostolopoulos | 709/231 |
| 7,869,468 B1 | 1/2011 | Giannakopoulos et al. | |
| 7,957,307 B2 * | 6/2011 | Qiu et al. | 370/252 |
| 2009/0323826 A1 * | 12/2009 | Wu et al. | 375/240.27 |
| 2010/0033622 A1 | 2/2010 | Bellers et al. | |

FOREIGN PATENT DOCUMENTS

EP    1342368    8/2011

OTHER PUBLICATIONS

Perkins et al., Options for Repair of Streaming Media, IP.com Prior Art Database, Jun. 1, 1998.

* cited by examiner

*Primary Examiner* — Christopher S Kelley
*Assistant Examiner* — Christopher Findley
(74) *Attorney, Agent, or Firm* — Kilpatrick Townsend & Stockton LLP

(57) ABSTRACT

A first predictive frame is exchanged between an encoder and a decoder. A second predictive frame is exchanged between the encoder and the decoder, where the first predictive frame is encoded using at least some portion of a first reference frame and the second predictive frame is encoded using at least some portion of a second reference frame different from the first reference frame.

20 Claims, 10 Drawing Sheets

At Interleaved Stream Encoder

At Stream Decoder

INTERLEAVED VIDEO STREAMS

BACKGROUND OF THE INVENTION

Live video streams (such as video conferences) are sometimes sent over packet-based networks. Packets containing parts of the video stream are sometimes lost (e.g., because a transmission buffer in network equipment along the way is full, because of electric perturbations, because packets are sent over WiFi or other wireless networks which are subject to interference, or other reasons). One technique to handle this is to retransmit the lost information. However, this increases latency and so in some applications like real-time video, this is not feasible or will result in a poor user experience. Another technique is to perform error concealment at the decoder. The decoder attempts to deal with the lost information as best it can, for example, by temporal extrapolation, spatial extrapolation, or motion vector extrapolation. Error concealment may be difficult to implement at the decoder since it is video codec-specific and may result in errors being propagated to later frames. Another technique to deal with lost or corrupted information is to use forward error correction by sending parity or other redundant information. This technique may be unattractive because it requires overhead which reduces the effective or useable throughput. Furthermore, many packets tend to be dropped, so there is a possibility forward error correction will fail if too many packets are dropped. It would be desirable if new techniques were developed which may be used to handle lost information in live video applications over packet-based networks.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on or in a (e.g., tangible) computer readable storage medium and comprising computer instructions; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
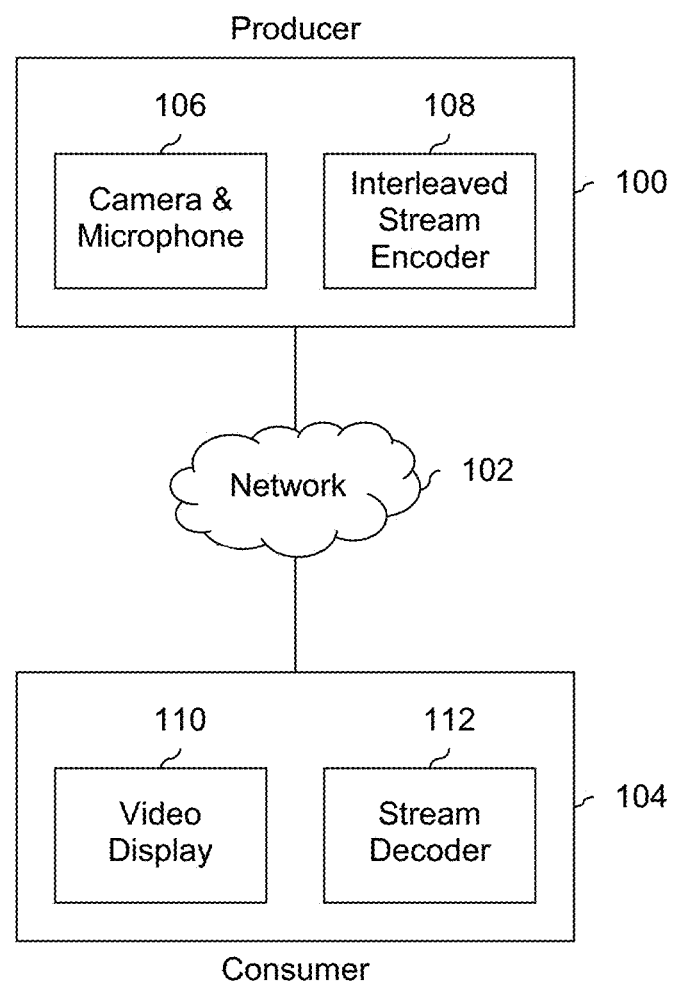
FIG. 1 is a diagram showing an embodiment of a producer and consumer.

FIG. 1 is a diagram showing an embodiment of a producer and consumer. In the example shown, producer 100 and consumer 104 are connected via network 102. In various embodiments, producer 100 and/or consumer 104 may be a computer (such as a desktop, laptop or netbook), a smart phone, a tablet, etc. Live video content is generated at the producer, for example a video conference between a user of producer 100 and a user of consumer 104. Content is captured at producer 100 using camera and microphone 106. A source stream of video (e.g., comprising a series of raw, un-encoded frames) is sent from camera and microphone 106 to interleaved stream encoder 108, which generates two or more interleaved streams. In various embodiments, the video codec used by interleaved stream encoder 108 (and similarly by stream decoder 112) includes H.264, Moving Picture Experts Group (MPEG), etc.

The interleaved streams are sent over network 102 to consumer 104. Network 102 is a packet-based network and in various embodiments includes a variety of network types and technologies, including (but not limited to) mobile telecommunications networks (e.g., 3G and 4G), Ethernet networks, etc. At consumer 104, stream decoder 112 performs the reverse operation performed by interleaved stream encoder 108. The two or more streams are decoded and decoded streams of video (e.g., comprising a series of un-encoded frames) are passed from stream decoder 112 to video display 110 for presentation to a user at consumer 104 (e.g., a participant in the video conference).

For clarity, this figure and other embodiments show only a unidirectional example, but the technique described herein has bidirectional application (e.g., device 104 may also be a producer and device 100 may also be a consumer so that a first user at device 100 and a second user at device 104 can have bidirectional experience, such as in a video conference). Also, although this figure shows only a single producer and a single consumer, in various embodiments any number of devices may be included.

A benefit to using interleaved streams is demonstrated when information is lost. Network 102 in this example is a packet-based network and packets may be lost because a transmission buffer in a network device becomes full and cannot store any more packets. Typically when this occurs, more than one packet is lost. If the delay through network 102 is relatively low (e.g., producer 100 is located in San Francisco, Calif. and consumer 104 is located in San Jose, Calif.), then consumer 104 may be able to recover from the loss (e.g., by requesting retransmission of the lost information from producer 100 and decoding and displaying the requested information at consumer 104) with an acceptable user experience. However, for longer delays (e.g., from San Jose, Calif. to Bangalore, India), requesting a retransmission may take too long and the user experience may be unacceptable. For example, the roundtrip time between the United States and India (for a LAN-to-LAN connection with a bandwidth of 500 Mps) may be 270.4 ms as opposed to 0.55 ms for a local connection (LAN-to-LAN with a bandwidth of 500 Mps). Interleaved streams permit new recovery techniques to be employed for such cases where the delay between a producer and a consumer is relatively large. Interleaved streams may take a variety of forms; the following figures show some embodiments but are not intended to be limiting. The following figures also show some embodiments of recovery techniques which may be employed with interleaved streams (e.g., in the event packets are lost on their way from a producer to a consumer). Interleaved streams are not limited to one recovery technique and a variety of recovery embodiments are described in further detail below. Although the examples described herein show video, the technique is applicable to audio and/or other types of encoded data and is not limited to video.

Figure 2:
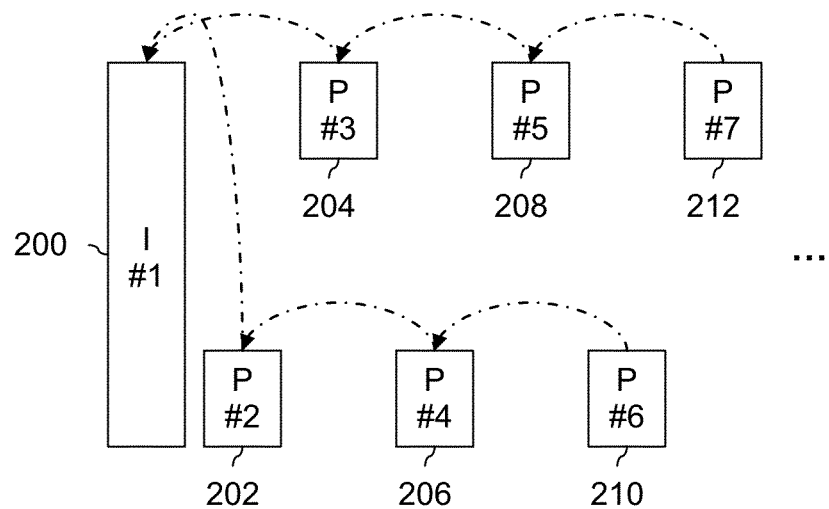
FIG. 2 is a diagram showing an embodiment of an interleaved stream.
Figure 2:
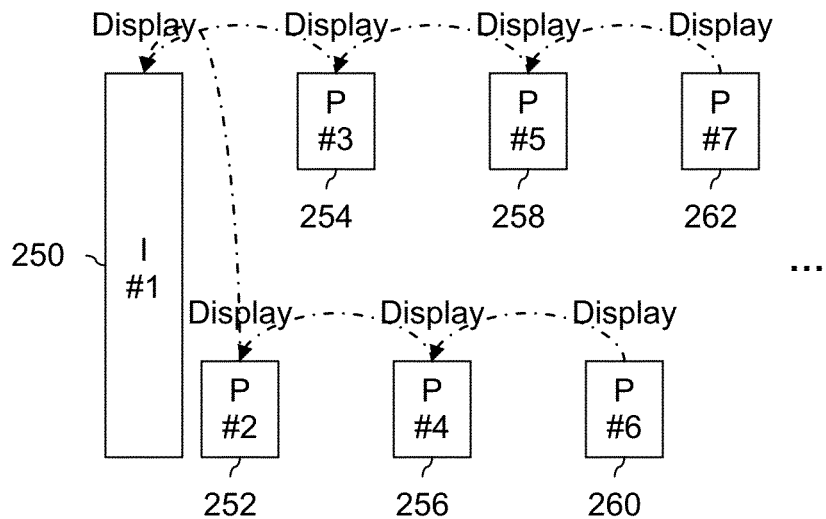

FIG. 2 is a diagram showing an embodiment of an interleaved stream. In the example shown, frames are one of two types: an I frame or a P frame. An I frame is an intra-coded picture frame where no other frame or information external to the I frame is needed to decode the I frame. A P frame, in contrast, is a predictive frame which references another frame and information from that referenced frame is required in order to decode the P frame properly. For example, P frame 202 may include differences in values between corresponding pixels in frame 200 (i.e., the frame it references) and itself. A P frame is permitted to reference an I frame or a P frame. Since an I frame is intra-coded and wholly self-contained, there is no concept of a reference frame for an I frame. P frames tend to be smaller than 1 frames but if there is information loss (e.g., a frame is lost or corrupted), it may be difficult to recover from and/or error propagation may occur. I frames tend to be larger than P frames but have more desirable properties in the event a frame is lost or corrupted (i.e., it can be decoded without the need for other frames and error propagation often ends with an I frame).

At the interleaved stream encoder (e.g., 108 in FIG. 1), a first frame 200 is generated. Frame 200 is an I frame and has a sequence number of 1 (hereinafter, "a frame with a sequence number of X" and "frame #X" are used interchangeably). The first stream includes frame 200, frame 202 (a P frame with a sequence number of 2 which references frame 200), frame 206 (a P frame with a sequence number of 4 which references frame 202), and frame 210 (a P frame with a sequence number of 6 which references frame 206). In this figure and some other figures, a dashed-dot arrow is used to indicate references between frames. The second stream includes frame 200, frame 204 (a P frame with a sequence number of 3 which references frame 200), frame 208 (a P frame with a sequence number of 5 which references frame 204), and frame 212 (a P frame with a sequence number of 7 which references frame 208). In this embodiment, a given P frame references the frame two frames prior, for example so that P frame 212 references P frame 208.

At the stream decoder (e.g., 112 in FIG. 1), the frames are received without any information loss and are decoded and displayed. Frame 250 (an I frame with a sequence number of 1) is decoded and displayed first. Then the P frames are decoded and displayed in the following order: frame 252 (with a sequence number of 2), frame 254 (with a sequence number of 3), frame 256 (with a sequence number of 4), frame 258 (with a sequence number of 5), frame 260 (with a sequence number of 6), and frame 262 (with a sequence number of 7).

The example shown in this figure shows the processes performed by an interleaved stream encoder and decoder when there is no information loss. The following figures show some embodiments of recovery techniques performed when there is some information lost (e.g., due to a lost or corrupted frame).

Figure 3:
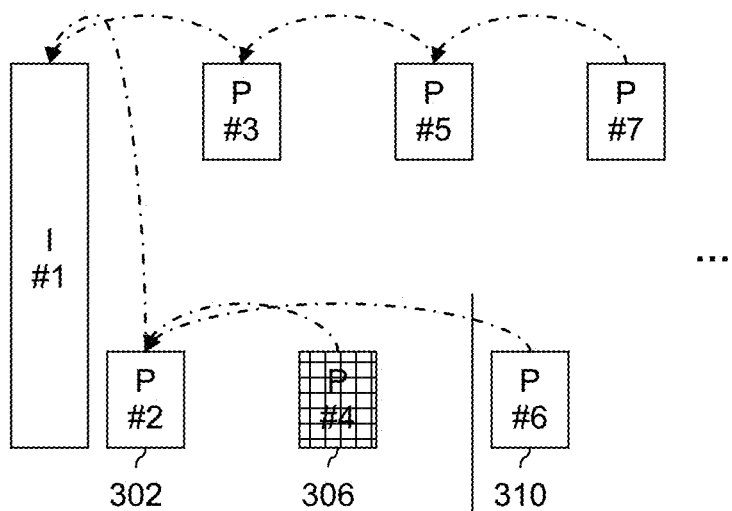
FIG. 3 is a diagram showing a first embodiment of recovering from a frame loss.
Figure 3:
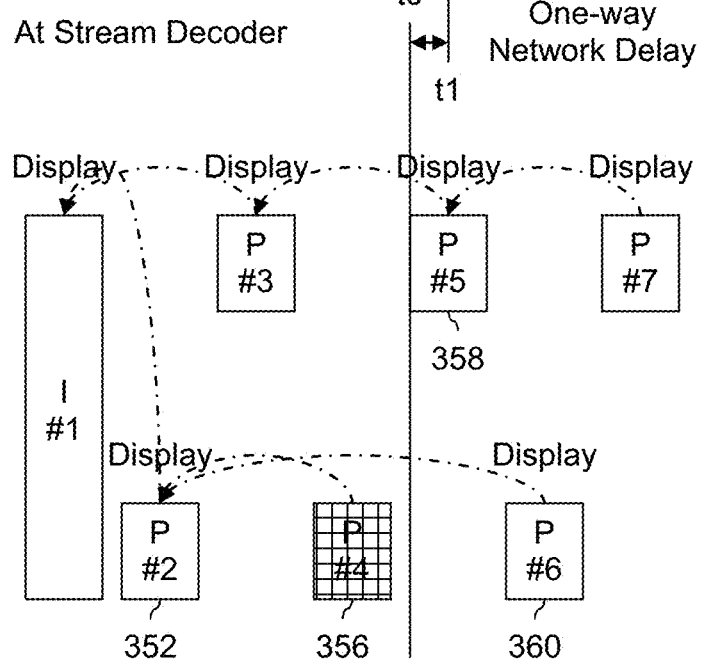

FIG. 3 is a diagram showing a first embodiment of recovering from a frame loss. In the example shown, the interleaved stream shown in FIG. 3 is identical to the stream shown in FIG. 2 in the beginning (i.e., the P frames reference a frame two frames prior). However, in this embodiment frame #4 is bad, for example because it is lost completely by the network or because it was received in a corrupted state. Although not described in this example, in some embodiments a frame is able reference a portion of a frame and so long as that portion is received properly, a subsequent frame can still be decoded properly; the technique also applies to such codecs.

At time t0, the stream decoder realizes that frame #4 (356) is bad and sends the interleaved stream encoder a message that frame #4 is bad. After traversing the network, the interleaved stream encoder at time t1 receives the message from the stream decoder that frame #4 is bad. The interleaved stream encoder then (i.e., at time t1) knows that the next P frame in the first stream (i.e., frame 310) cannot reference frame 306 because the stream decoder does not have frame #4 and thus cannot decode any frame which references it. As such, frame 310 (at least in this embodiment) is encoded by the interleaved stream encoder to reference frame #2 (302) instead of referencing frame #4 (306), as it normally would. Put another way, the interleaved stream encoder references the most recent good frame (of any type) in the first stream once it is notified there is a bad frame in the first stream. In this case, the most recent good frame is frame #2.

Meanwhile, back at the stream decoder, frame #5 (358) is decoded and displayed. Since each frame references a frame two frames prior, the loss of frame #4 does not affect frame #5 and it can be properly decoded and displayed while the stream decoder notifies the interleaved stream encoder, and the interleaved stream encoder changes the anticipated or default reference of frame #6 from frame #4 to a good frame (in this example, frame #2). If the frames instead had referenced the frame immediately prior, frame #5 (358) would also have been lost (since the interleaved stream encoder had already encoded and transmitted frame #5 by the time it was notified about the bad frame #4) and two frames would have been lost instead of one.

Frame 360 is then received at the stream decoder. Since it references frame #2 (352) and the stream decoder has that frame, frame #6 is decoded properly and displayed at the consumer.

Referencing the most recent good frame (e.g., at an interleaved stream encoder) may be desirable because it tends to keep the size of frame #6 relatively small. In general, the further apart a reference and a P frame are, the larger that P frame will tend to be (because the difference in two pictures tends to increase with time or frames and assuming no cutaway).

Figure 4:
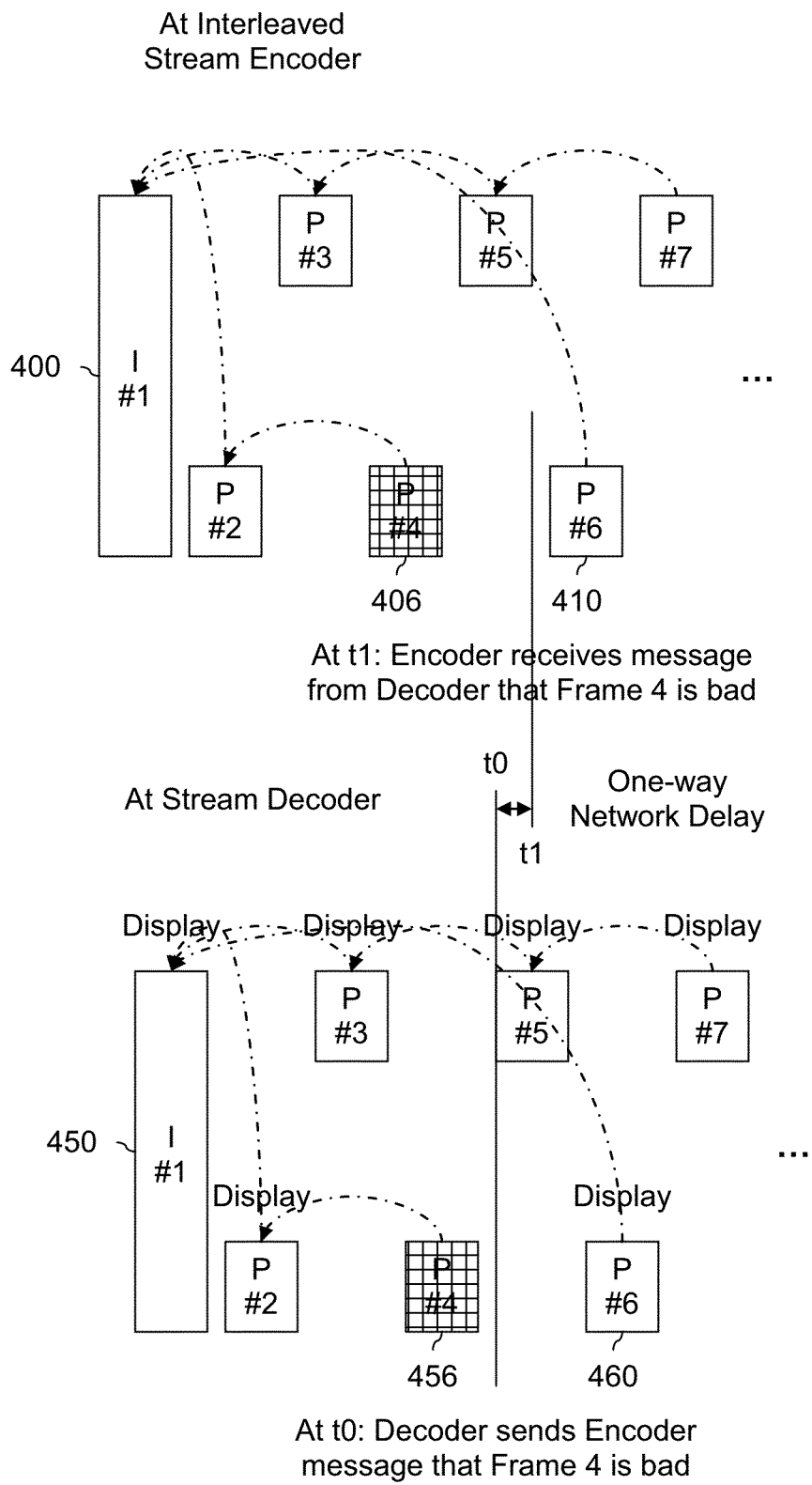
FIG. 4 is a diagram showing a second embodiment of recovering from a frame loss.

FIG. 4 is a diagram showing a second embodiment of recovering from a frame loss. The example in this figure is similar to that in FIG. 3, in that the P frames reference a frame two frames prior and frame #4 is bad. However, in this embodiment the interleaved stream encoder has frame #6 (410) reference the I frame (400). As in the previous example, only one frame is not able to be displayed at the consumer.

Figure 5:
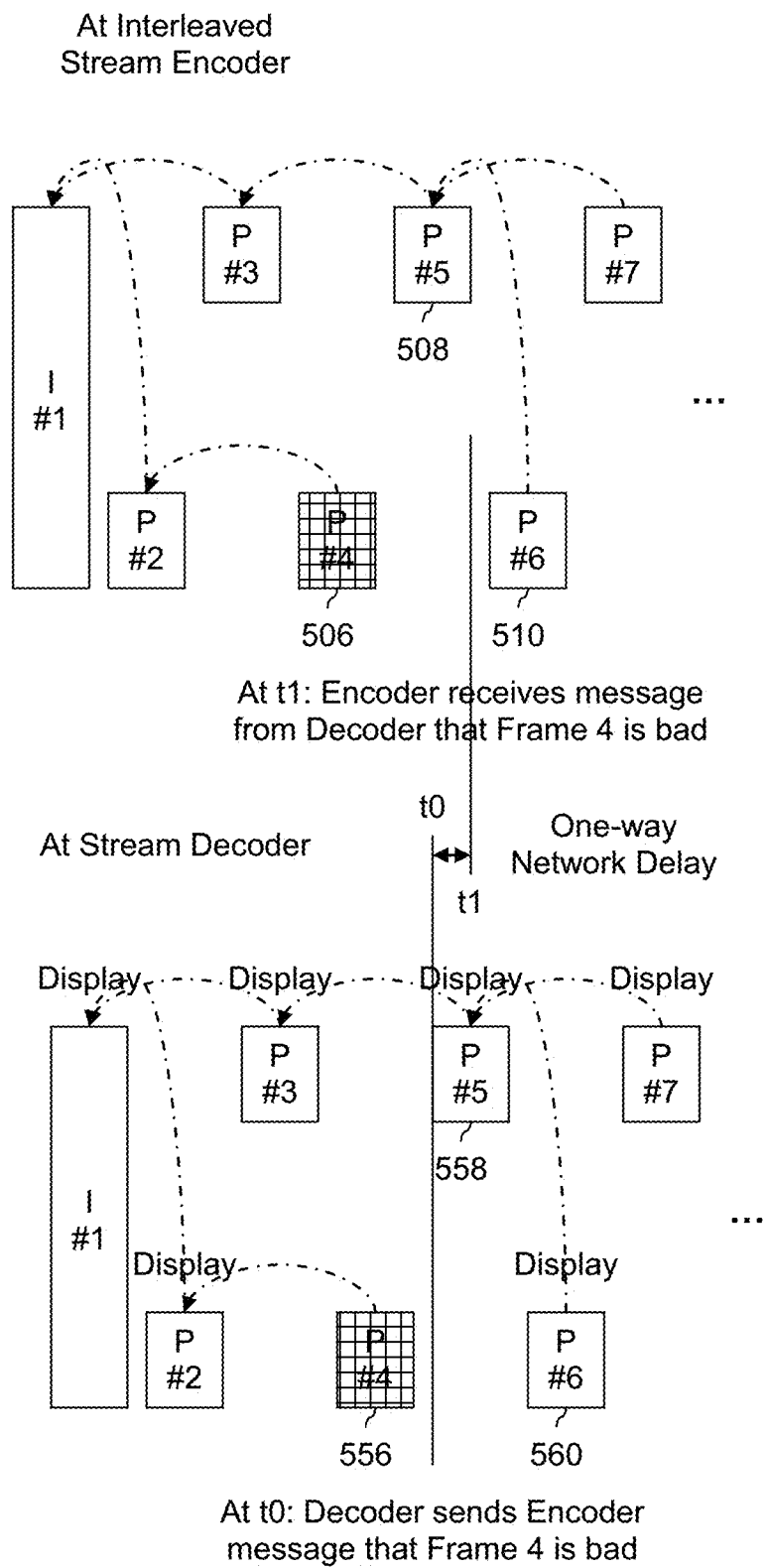
FIG. 5 is a diagram showing a third embodiment of recovering from a frame loss.

FIG. 5 is a diagram showing a third embodiment of recovering from a frame loss. The example in this figure is similar to that in the previous figures. However, in this embodiment the interleaved stream encoder has frame #6 (510) reference frame #5 (508). The upside to this embodiment is that the size of frame #6 will tend to be the smallest possible (since frame #5 is the closest temporally to frame #6 it is likely to be the closest and thus the difference between the two will tend to be the smallest).

In some embodiments, a delay (such as a one-way network delay or a round-trip network delay) is taken into consideration when determining how to encode frames at an interleaved stream encoder. For example, in some embodiments, if the one-way or round-trip network delay is approximately 2 or 3 longer than the examples shown in FIGS. 2-4, then each P frame may reference a frame which is 2, 3, or even 4 frames prior to it to account for the longer delay. In some embodiments, an interleaved stream is constructed so that prior to construction of a particular frame at an encoder, the encoder knows (e.g., definitively or explicitly) that a reference frame from which the encoder plans or is intending the construct the given frame from has been properly received at the decoder. This gives the encoder sufficient time (if needed) to change a reference frame (from which the frame in question is to be constructed) in the event the anticipated reference frame is not available at the decoder.

The figures described above are a specific example with (for example) a specific codec and a specific handshaking and are not intended to be limiting. For example, the figures described above show frames which only reference frames prior to them, in some other embodiments, a frame is permitted to reference a frame before it and/or a frame after it. Also, although the figures described above show a frame referencing only one other frame, some other codecs permit a frame to reference two or more frames. Some other systems also use different handshaking to indicate to the encoder that a frame is bad or, more generally, to initiate recovery of a frame. The following figure shows some examples of such variations.

Figure 6:
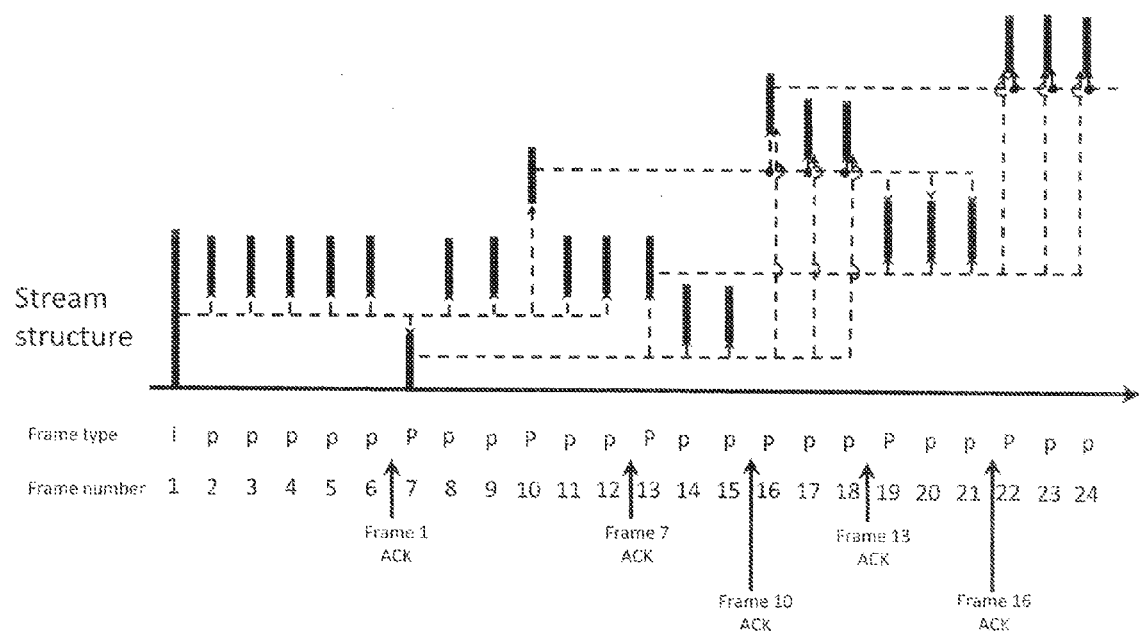
FIG. 6 is a diagram showing an embodiment of an interleaved stream where frames are permitted (if desired) to reference two or more frames.

FIG. 6 is a diagram showing an embodiment of an interleaved stream where frames are permitted (if desired) to reference two or more frames. In the example shown, the first frame is an I frame and (at least for the frames shown here) there is no further I frame in the stream. In some embodiments, an encoder may "re-start" a stream by generating and sending an I frame (e.g., if a certain amount of time has elapsed, or if there is a cutaway or other scene change where it makes sense to use an I frame because there is little or no similarity in a frame to previous frames).

In the example shown, the encoder (not shown) waits until it receives acknowledgment of reception of frame 1 before generating a new reference frame. In this example, there are 3 types of frames: I frames, P frames and p frames. I frames and P frames are able to be referenced (if desired) by other frames, whereas p frames cannot be referenced by another frame. I frames do not reference other frames, whereas P frames and p frames do (i.e., P frame and p frames are predictive). As described above, although this example codec does not have bi-directional prediction, other codecs permit it and the technique described herein applies to such codecs as well.

In this example, the latency (also referred to as delay) for an acknowledgement is 6 frames, so frame 7 is the first reference frame for which the encoder knows that frame 1 has been received properly. As such, the encoder constructs frame 7 with some or all of frame 1. For example, frame 7 can reference only a portion of frame 1 (and construct the rest from scratch) or reference all of frame 1 (so that nothing of frame 7 is constructed from scratch). In this example, subsequent reference frames are interleaved every 3 frames to maximally protect the system against bursts of packet loss (which is pattern often observed on IP networks). In this example, the maximum is associated with interleaving every 3 frames because that is what the system can handle given its constraints (i.e., the acknowledgement day of 6 frames and the maximum number of permitted reference frames at a given time which in this example is 4).

When acknowledgement of frame 7 is received, frame 7 can then be used to build new frames. Later in the stream (e.g., beginning with frame 16), frames are built using portions of the 2 more recent reference frames acknowledge by the consumer. For example, in constructing frame 16, frame 13 is a reference frame but it has not yet been acknowledged, so frame 16 is constructed using portions of frame 7 and portions of frame 10.

In this example, a consumer is limited to 4 reference frames. So, for example, when the acknowledgement for frame 16 is received, frame 22 (which is constructed next) cannot reference frame 1 since the 4 most recent reference frames are frames 7, 10, 13, and 16.

As described above, a variety of recovery techniques may be used with interleaved streams. The following figure describes an embodiment where another consumer assists in recovery of the lost information.

Figure 7:
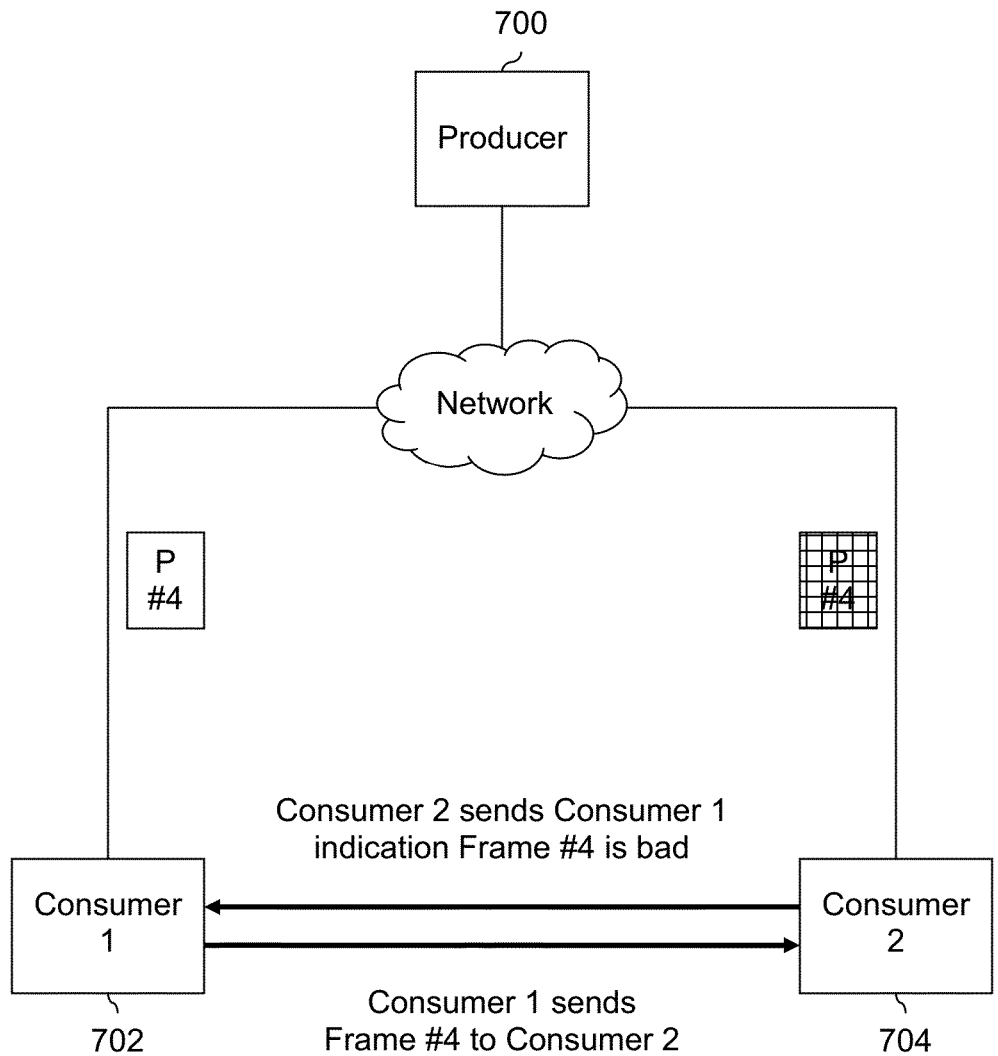
FIG. 7 is a diagram showing an embodiment where a consumer obtains a copy of a bad frame from another consumer.

FIG. 7 is a diagram showing an embodiment where a consumer obtains a copy of a bad frame from another consumer. In the example shown, two consumers (702 and 704) receive a video stream from producer 700. At the second consumer (704), one of the frames is bad, for example because it was lost by the network or was received in a corrupted state at consumer 704. The second consumer (704) sends an indication to the first consumer (702) that frame #4 is bad. In response to the indication, the first consumer (702) returns a copy of that frame to the second consumer (704).

In this particular example, the delay between the two consumers is less than the delay between the second consumer (704) and the producer (700). For example, the producer (700) could be in Bangalore, India and the first and second consumers (702 and 704) are in San Jose, Calif. and San Francisco, Calif., respectively. Obtaining the lost information from another consumer may be desirable in cases like this since it may be faster to obtain the lost information from the other consumer instead of the producer.

In some embodiments, a consumer measures a delay associated with a producer, a delay associated with a consumer and determines which one to obtain lost information from in the event of an error. In various embodiments, pings or other utilities are used to measure a one-way or roundtrip delay associated with a producer or another consumer. In some embodiments, this measurement and determination process is determined during an initialization process (e.g., before any error occurs). In some embodiments there are three or more consumers and pings or other measurement techniques are used for all other consumers. In some embodiments, IP addresses or other identifiers which indicate a local network or local region or other techniques which do not measure delay are used to select a device from which to request information should information be lost. For example, it may be possible to determine at least some location information, such as the specific state or country associated with a given IP address even if city cannot be determined.

In various embodiments, various configurations may be used to perform the techniques described herein. The following figures show some embodiments of an interleaved stream encoder and decoder.

Figure 8:
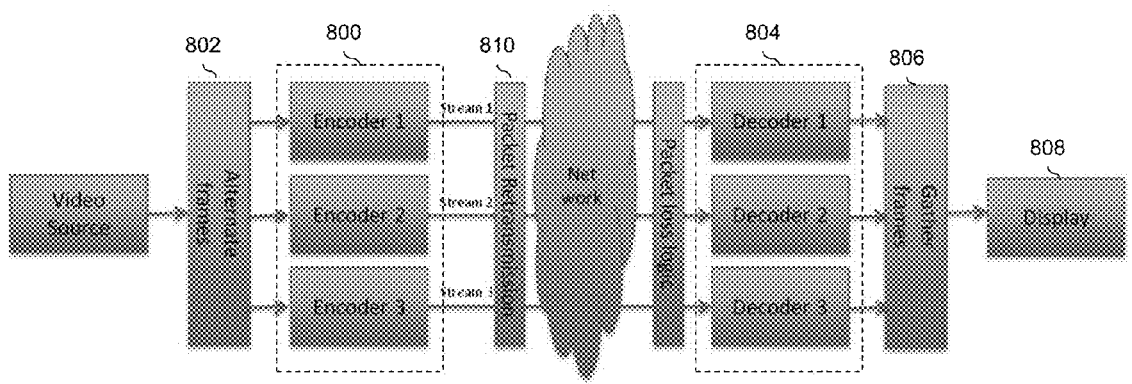
FIG. 8 is a diagram showing an embodiment of interleaved stream system implemented using a generic codec.

FIG. 8 is a diagram showing an embodiment of interleaved stream system implemented using a generic codec. In this example, no assumptions are made about the capabilities of the video codec. Therefore, the only thing that can be assumed is that, given frames as an input to the encoder and given the output stream to the decoder, the display will match the video source.

In this example, 3 interleaved streams are generated and transmitted using 3 encoders (800). Alternate frames module 802 gives each encoder only 1 out of 3 frames. For example, the first (un-encoded) frame would go to the first encoder, the second to the second encoder, and so on.

On the other side, 3 decoders (804) respectively decode each stream, and the decoded frames are regrouped into a single sequence by gather frames module 806 before display at 808. The following figure shows an example of a frame loss for the system shown here.

Figure 9:
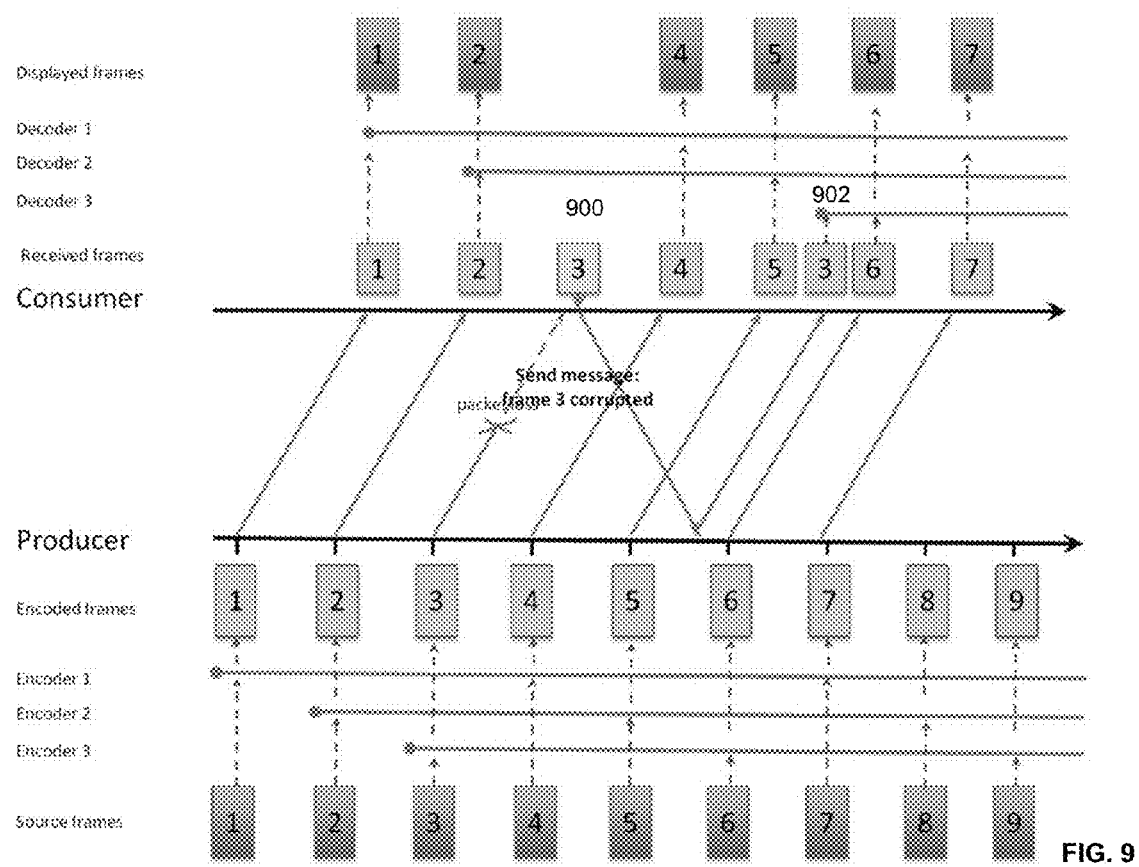
FIG. 9 is a diagram showing an embodiment of a recovery process using a system constructed with a generic codec where the capabilities are unknown or otherwise cannot be assumed.

FIG. 9 is a diagram showing an embodiment of a recovery process using a system constructed with a generic codec where the capabilities are unknown or otherwise cannot be assumed. In the example shown, a packet which contains some or all of frame 3 is lost during transmission (900) and a feedback message is sent to the producer (or an intermediate server in the middle which buffers the stream), for retransmission of the missing data. At the display, frame 3 may be skipped. When the retransmitted data is received, frame 3 is decoded (902) so that it can be used by decoder 3 to re-construct subsequence frames but is not displayed since it is out of order.

Note that in this particular example there is sufficient time for frame 3 to be retransmitted (e.g., before the scheduled time to generate and/or transmit frame 6). In some cases, there may not be sufficient time (e.g., it is too close to the scheduled transmission time for frame 6, or frame 3 would need to be re-encoded and it would take too long, etc.) and in such situations the example shown may not be possible. In some embodiments, a system is configured to handle a variety of situations (e.g., if time permits, do a first remedy, otherwise do a second remedy).

Figure 10:
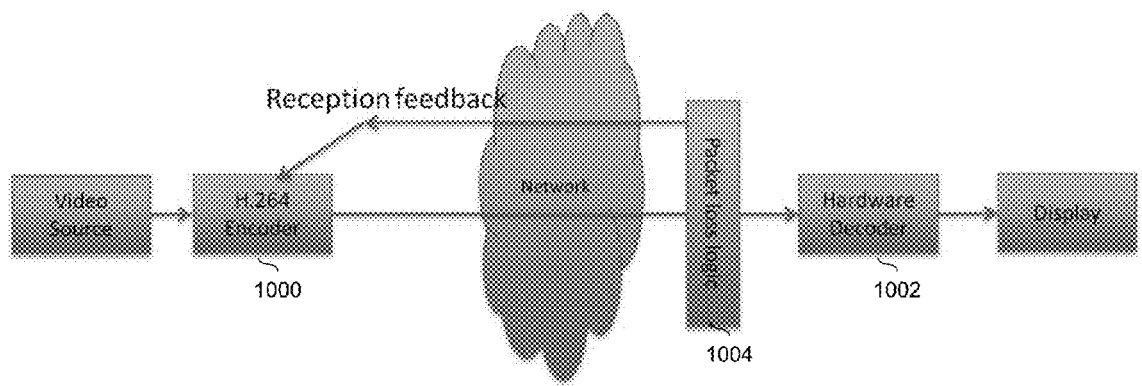
FIG. 10 is a diagram showing an embodiment of an interleaved stream system implemented using H.264 for the video codec and a hardware decoder.

FIG. 10 is a diagram showing an embodiment of an interleaved stream system implemented using H.264 for the video codec and a hardware decoder. In the example shown, it is known or otherwise assumed that the hardware decoder implements error resilience and error concealment (but the technique in general does not require this) and supports up to 4 reference frames.

The video encoder (1000 is a H.264 encoder that is configured to use only portions of frames as reference that have been acknowledged be the receiver, and to create a number of number of interleaved sub-streams, taking into account the actual latency (e.g., how long it takes an acknowledgement to be returned) and the supported number of frame references by the decoder (in this example, 4).

On the consumer side, received data is transmitted to the hardware decoder (1002) as soon as it is received, and a reception acknowledgement is sent to the producer (e.g., by packet loss logic 1004). In this example, acknowledgments are only generated and sent for reference frames, such as I frames, P frames. In some cases, an H.264 codec references only part of a given frame (e.g., and the rest of the frame is constructed from another frame or from scratch) and an acknowledgement identifies what portion was received properly. This permits an encoder to construct a frame from a portion of a frame that was received properly for those cases where some part of a reference frame was received properly but some portion of that frame was not received properly.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for recovering from a frame loss during the exchange of interleaved video streams between an interleaved stream encoder and a decoder, the method comprising:
   using an interleaved stream encoder to begin generating from a source video stream a first interleaved video stream and a second interleaved video stream, wherein the first interleaved video stream comprises an intra-coded frame and a first sequence of predictive frames and wherein the second interleaved stream comprises the intra-coded frame and a second sequence of predictive frames;
   wherein each predictive frame of each of the first sequence of predictive frames and the second sequence of predictive frames is encoded using at least some portion of a reference frame that is at least two frames prior to it in the source video stream;
   wherein the interleaved stream encoder is configured to:
      generate the first sequence of predictive frames to include a first predictive frame that is encoded using a first reference frame; and
      generate the second sequence of predictive frames to include a second predictive frame that is encoded using a second reference frame and a third predictive frame that is encoded using a third reference frame;
   initiating transmission of the first interleaved video stream and the second interleaved video stream to a decoder via a network;
   receiving from the decoder one or more messages indicating that the second predictive frame has been lost or corrupted prior to receipt by the decoder; and
   in response to receiving the one or more messages, reconfiguring the interleaved stream encoder to encode the third predictive frame using one of the first reference frame, the second reference frame, or any other frame occurring prior to it in the source video stream, instead of the third reference frame, prior to transmission of the third predictive frame to the decoder.

2. The method of claim 1, wherein one or both of the first and second predictive frames is/are encoded using one or more of the following: H.264 or Moving Picture Experts Group (MPEG).

3. The method of claim 1, wherein there is a delay between the first reference frame and the first predictive frame and the delay includes one or more of the following: a delay associated with the decoder notifying the interleaved stream encoder about a frame that is at least partially corrupted or a delay associated with the decoder acknowledging to the interleaved stream encoder receipt of a frame that is at least partially good.

4. The method of claim 1, wherein the third predictive frame is encoded using the first predictive frame.

5. The method of claim 1, wherein the third predictive frame is encoded using the intra-coded frame.

6. The method of claim 1, wherein the first reference frame, the second reference frame, or the any other reference frame includes one or more of the following: an I frame or a P frame.

7. The method of claim 1, wherein the first reference frame, the second reference frame, or the any other reference frame includes a most recent reference frame which was not lost or corrupted prior to receipt by the decoder.

8. The method of claim 1, wherein the one or more messages acknowledge receipt of the intra-coded frame and the first predictive frame.

9. The method of claim 1, in response to receiving the one or more messages, receiving a copy of the second predictive frame from a second decoder, and wherein the third predictive frame is encoded using the copy of the second predictive frame.

10. A system for recovering from a frame loss during the exchange of interleaved video streams between an interleaved stream encoder and a decoder, the system comprising:
 a processor; and
 a memory coupled with the processor, wherein the memory is configured to provide the processor with instructions which when executed cause the processor to:
  use the interleaved stream encoder to begin generating from a source video stream a first interleaved video stream and a second interleaved video stream, wherein the first interleaved video stream comprises an intra-coded frame and a first sequence of predictive frames and wherein the second interleaved stream comprises the intra-coded frame and a second sequence of predictive frames,
  wherein each predictive frame of each of the first sequence of predictive frames and the second sequence of predictive frames is encoded using at least some portion of a reference frame that is at least two frames prior to it in the source video stream;
  wherein the interleaved stream encoder is configured to:
   generate the first sequence of predictive frames of the first stream to include a first predictive frame that is encoded using a first reference frame; and
   generate the second sequence of predictive frames to include a second predictive frame that is encoded using a second reference frame and a third predictive frame that is encoded using a third reference frame;
  initiate transmission of the first interleaved video stream and the second interleaved video stream to a decoder via a network;
  receive from the decoder one or more messages indicating that the second predictive frame has been lost or corrupted prior to receipt by the decoder; and
  in response to receiving the one or more messages, reconfiguring the interleaved stream encoder to encode the third predictive frame using one of the first reference frame, the second reference frame, or any other frame occurring prior to it in the source video stream, instead of the third reference frame, prior to transmission of the third predictive frame to the decoder.

11. The system of claim 10, wherein one or both of the first and second predictive frames is/are encoded using one or more of the following: H.264 or Moving Picture Experts Group (MPEG).

12. The system of claim 10, wherein there is a delay between the first reference frame and the first predictive frame and the delay includes one or more of the following: a delay associated with the decoder notifying the interleaved stream encoder about a frame that is at least partially corrupted or a delay associated with the decoder acknowledging to the interleaved stream encoder receipt of a frame that is at least partially good.

13. The system of claim 10, wherein the third predictive frame is encoded using the first predictive frame.

14. The system of claim 10, wherein the third predictive frame is encoded using the intra-coded frame.

15. The system of claim 10, wherein the first reference frame, the second reference frame, or the any other reference frame includes a most recent reference frame which was not lost or corrupted prior to receipt by the decoder.

16. A computer program product for recovering from a frame loss during the exchange of interleaved video streams between an interleaved stream encoder and a decoder, the computer program product being embodied in a non-transitory computer readable storage medium and comprising computer instructions for:
 using an interleaved stream encoder to begin generating from a source video stream a first interleaved video stream and a second interleaved video stream, wherein the first interleaved video stream comprises an intra-coded frame and a first sequence of predictive frames and wherein the second interleaved stream comprises the intra-coded frame and a second sequence of predictive frames;
 wherein each predictive frame of each of the first sequence of predictive frames and the second sequence of predictive frames is encoded using at least some portion of a reference frame that is at least two frames prior to it in the source video stream;
 wherein the interleaved stream encoder is configured to:
  generate the first sequence of predictive frames to include a first predictive frame that is encoded using a first reference frame; and
  generate the second sequence of predictive frames to include a second predictive frame that is encoded using a second reference frame and a third predictive frame that is encoded using a third reference frame;
 initiating transmission of the first interleaved video stream and the second interleaved video stream to a decoder via a network;
 receiving from the decoder one or more messages indicating that the second predictive frame has been lost or corrupted prior to receipt by the decoder; and
 in response to receiving the one or more messages, reconfiguring the interleaved stream encoder to encode the third predictive frame using one of the first reference frame, the second reference frame, or any other frame occurring prior to it in the source video stream, instead of the third reference frame, prior to transmission of the third predictive frame to the decoder.

17. The computer program product of claim 16, wherein there is a delay between the first reference frame and the first predictive frame and the delay includes one or more of the following: a delay associated with the decoder notifying the interleaved stream encoder about a frame that is at least partially corrupted or a delay associated with the decoder acknowledging to the interleaved stream encoder receipt of a frame that is at least partially good.

18. The computer program product of claim 16, wherein the third predictive frame is encoded using the first predictive frame.

19. The computer program product of claim 16, wherein the third predictive frame is encoded using the intra-coded frame.

20. The computer program product of claim 16, wherein the first reference frame, the second reference frame, or the any other reference frame includes a most recent reference frame which was not lost or corrupted prior to receipt by the decoder.

\* \* \* \* \*